Jan. 13, 1931.  O. G. MANDT  1,788,580
WEIGHING MECHANISM FOR CONCRETE COMPONENTS
Filed Jan. 9, 1930   2 Sheets-Sheet 1

Inventor
OBERT G. MANDT
By
his Attorneys

Jan. 13, 1931. O. G. MANDT 1,788,580
WEIGHING MECHANISM FOR CONCRETE COMPONENTS
Filed Jan. 9, 1930 2 Sheets-Sheet 2

Inventor
OBERT G. MANDT

Patented Jan. 13, 1931

1,788,580

UNITED STATES PATENT OFFICE

OBERT G. MANDT, OF COLUMBUS, OHIO, ASSIGNOR TO THE JAEGER MACHINE COMPANY, OF COLUMBUS, OHIO, A CORPORATION OF OHIO

WEIGHING MECHANISM FOR CONCRETE COMPONENTS

Application filed January 9, 1930. Serial No. 419,665.

This invention relates to weighing scales and particularly to such as are designed for use in weighing the several solid ingredients of a concrete mixture and so that such ingredients may be correctly proportioned according to specifications.

Concrete mixing machines, as well understood, include a rotating mixing drum and a "skip" or bucket adapted to be raised to charge the drum with the materials to be mixed and lowered to receive the materials, the bucket being raised by a power operated hoisting mechanism including a cable and lowered by gravity under the control of a brake, but oftentimes, through accident or carelessness on the part of the workman the lowering is unduly precipitate. As the weighing scale is placed in position to be operated under the bucket so that it can be lowered to rest on the platform of the scale for the purpose of weighing the concrete ingredients the scale mechanism may be greatly damaged if the bucket be violently precipitated onto the platform. Hence the principal object of the invention is to provide means whereby such possible damage is avoided. Other objects will appear from the disclosure herein.

In the accompanying drawings—

Figure 1:
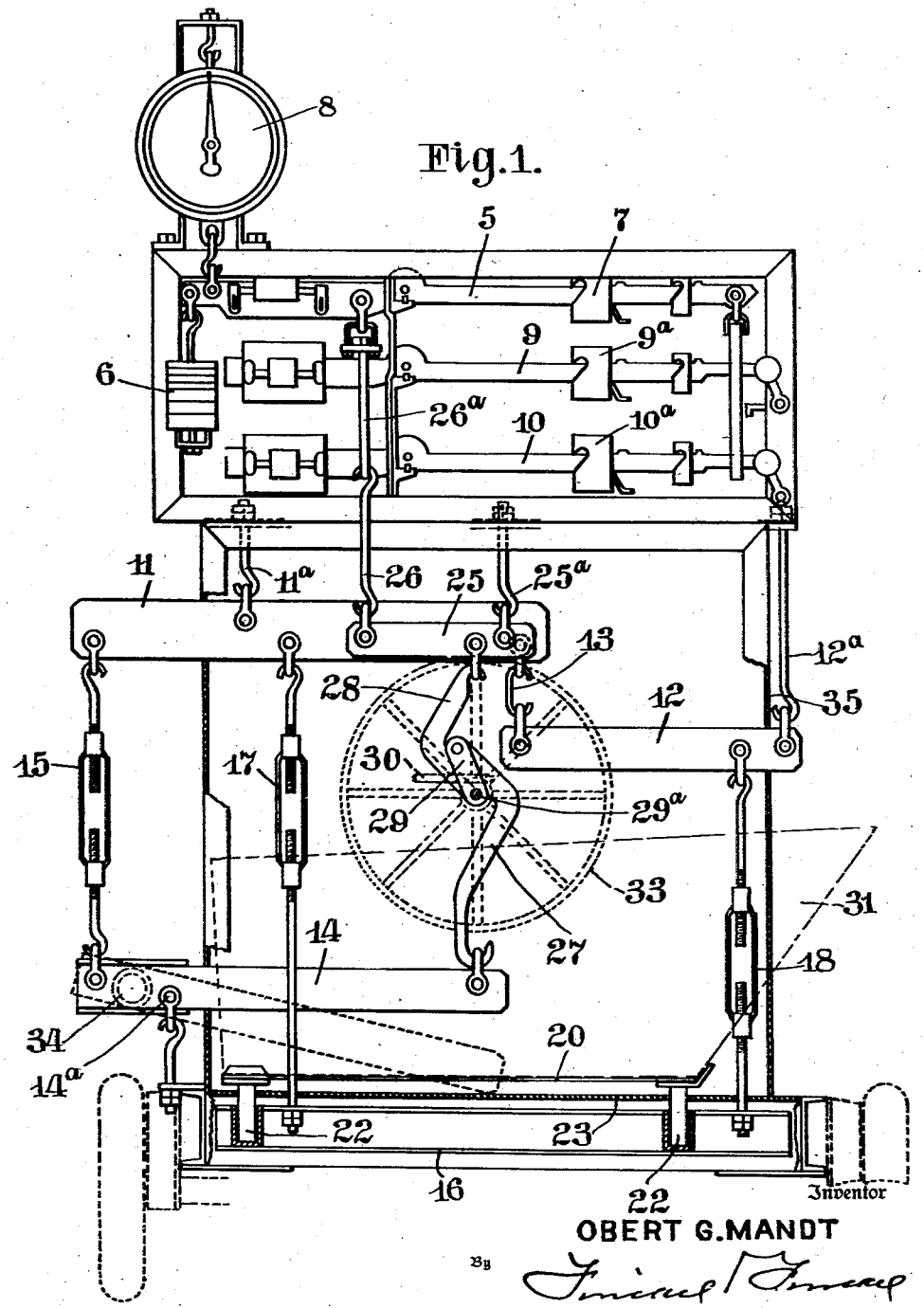
Figure 1 illustrates in combined side view and section, the parts in section being mainly on the lines I—I and $I^a$—$I^a$ Fig. 2, a weighing scale with hoods removed and containing the improvements, according to the invention, the skip or bucket being shown in broken lines as resting on the platform to receive and weigh the materials.

The weighing mechanism may be such as is ordinarily used in independently weighing constitutents of concrete and briefly includes the main beam 5 with removable weights at 6, a sliding weight at 7 for primarily balancing the empty bucket, and an indicator at 8 actuated by the main beams. Such scale also includes a beam 9 with a sliding weight $9^a$ for weighing the gravel or stone and a beam 10 with a sliding weight $10^a$ for weighing the sand.

The cement of known weight is usually contained in a sack and such cement is added to the dry mixture of stone (or gravel) and sand in the bucket. At 11 is an intermediate lever loosely supported on a fixed hook $11^a$, and at 12 is another intermediate lever loosely supported on a fixed hook $12^a$. The inner ends of the levers 11 and 12 are loosely shackled together at 13. Pivoted at $14^a$ is a beam or lever 14, the outer end of which is connected with the outer end of the lever 11 by means of a turn-buckle 15.

The main weighing platform 16 is suspended from the levers 11 and 12 by means of suitable bolts coupled with turn-buckles 17 and 18 respectively.

Figure 2:
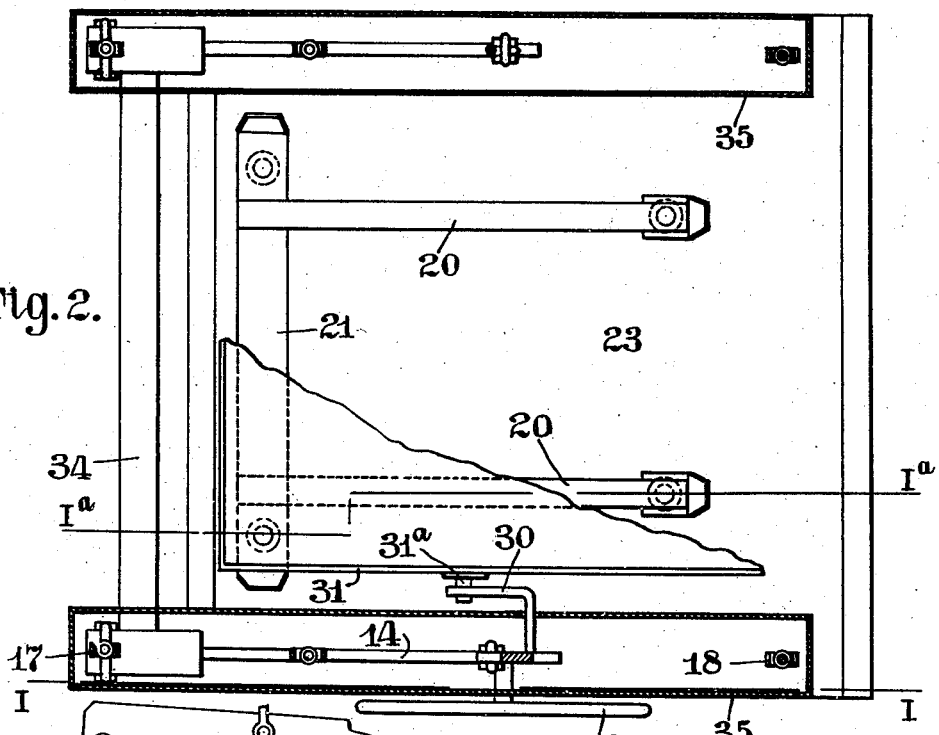
Fig. 2 is a horizontal section on the line II—II Fig. 3 with parts broken out and looking down toward the platform.

A supplemental support for the bucket on the weighing platform consists of a pair of parallel flat bars 20, 20 (see Fig. 2) connected with a cross bar 21. These bars are provided with four pins or plungers 22, that extend through holes in a fixed cover 23 into sockets 24 in the main platform 16 so that when the main platform is in elevated weighing position the supplemental support for the bucket and the load are borne by the main weighing platform. When the main platform is released the supplemental platform is supported by the cover 23. The main platform and supplemental platform can be referred to as the weighing or scale platform.

According to the present invention the weight of the platform and its load are transmitted to the scale beams through a lever 25 hung loosely on a hook $25^a$, links 26 and $26^a$, and a connecting device composed of two bent arms 27 and 28 connected with the levers 14 and 25 respectively and with each other by means of a link 29. The form of the hook arms 27 and 28 is such that when the adjacent bent portions are folded together with the pivots thus out of the draft line as shown in Fig. 1 they are locked, and the weight of a load imposed on the platform is exerted through the levers and the connections on the scale beams.

According to this invention means are also provided whereby the connecting devices 27, 28 and 29 can be unlocked when the bucket is raised from the weighing platform, and means whereby said devices can be locked after the bucket is lowered to be weighed.

Figure 3:
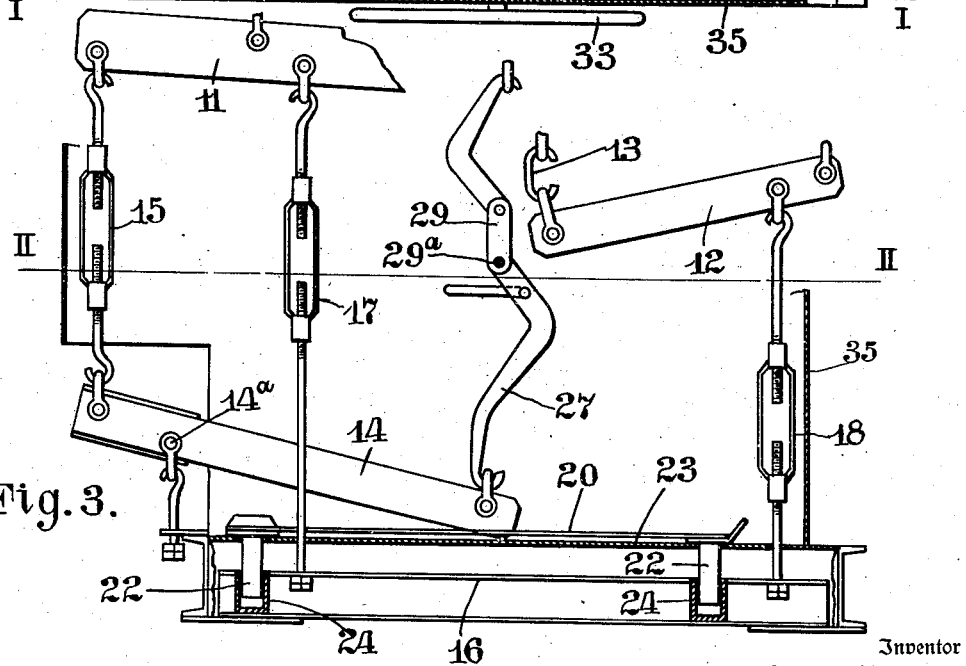
Fig. 3 is a detail in side view and section illustrating how the connection between the platform and scale beams is released.

The means for unlocking said parts when the bucket is raised consists of a crank member 30 fixed to the lower bent arm 27, said crank arm being struck by a projecting pin 31ª on the skip 31 (see Fig. 2) as the latter rises thereby throwing the parts 27, 28 and 29 into unlocked position as shown in Fig. 3, with the consequence that the levers 11, 14, 12, and 25 and the weighing platform are dropped as indicated in Fig. 3. Therefore if the bucket should accidentally or through negligence fall its impact will be on the supplemental platform and not on the main platform thereby saving the sensitive weighing mechanism with which it is connected from injurious operation.

The means for restoring the parts 27, 28 and 29 to locked and normally weighing position consists of a hand wheel 33 fixedly connected with the lever 29 at the pin 29ª thereof. By turning said hand wheel anti-clockwise the parts 27, 28 and 29 are moved into locked position as shown in Fig. 1.

In practice, therefore, the unlocking of the parts 27, 28 and 29 is automatic, and relocking manual, this last operation being regularly performed by an attendant after the bucket has descended to the supplemental platform.

The mechanism is, of course, inclosed in suitable housing 35 and where the shanks of the crank 30 and hand wheel 33 extend through said housing the openings are sufficiently large to permit the play of said shanks in the operations involved.

The platform supporting means as by the bar 34 but not the weighing beams etc. are suitably duplicated at opposite sides to effect a cross balancing for the weighing platform.

The forms of the parts can be changed without departing from the gist of the invention as claimed.

What is claimed is:

1. In a weighing device for concrete materials including weighing mechanism and a platform adapted to receive a receptacle for the concrete materials, means connecting the platform with the weighing mechanism adapted to be automatically released by the raising of the receptacle after the loading thereof.

2. In a weighing device for concrete materials including weighing mechanism and a platform adapted to receive a receptacle for the concrete materials, said platform including a main portion and a supplemental portion movable with respect to the main portion but adapted to be supported thereby, means operably connecting the main portion of the platform with the weighing mechanism adapted to be temporarily released after loading the receptacle.

3. In a weighing device for concrete materials including weighing mechanism and a platform adapted to receive a receptacle for the concrete materials, said platform including a main portion and a supplemental portion movable with respect to the main portion but adapted to be supported thereby, means operably connecting the main portion of the platform with the weighing mechanism adapted to be temporarily released after loading the receptacle and means between the main and supplemental platform for supporting the supplemental platform when said connecting means is released.

4. In a weighing device for concrete materials including weighing mechanism and a platform adapted to receive a receptacle for the concrete materials, said platform including a main portion and a supplemental portion movable with respect to the main portion but adapted to be supported thereby, means operably connecting the main portion of the platform with the weighing mechanism adapted to be temporarily released after loading the receptacle, means for restoring said connecting means to operable position.

5. In a weighing device for concrete materials including weighing mechanism and a platform adapted to receive a receptacle for the concrete materials, said platform including a main portion and a supplemental portion movable with respect to the main portion but adapted to be supported thereby, means operably connecting the main portion of the platform with the weighing mechanism adapted to be temporarily automatically released after loading the receptacle.

OBERT G. MANDT.